United States Patent [19]

Hafner et al.

[11] Patent Number: 4,986,178
[45] Date of Patent: Jan. 22, 1991

[54] HOLDING ARRANGEMENT FOR A DEVICE DIRECTED AGAINST A LINEARLY ADJUSTABLE ROLL, SUCH AS A DOCTOR BLADE, BLOWING DEVICE OR SIMILAR

[75] Inventors: Paul Hafner; Christian Schiel, both of Heidenheim, Fed. Rep. of Germany

[73] Assignee: J.M. Voith GmbH, Heidenheim, Fed. Rep. of Germany

[21] Appl. No.: 343,041

[22] Filed: Apr. 25, 1989

[30] Foreign Application Priority Data

Apr. 30, 1988 [DE] Fed. Rep. of Germany ....... 3814752

[51] Int. Cl.⁵ ............................................. B30B 3/04
[52] U.S. Cl. .................. 100/174; 15/256.51; 68/270; 72/236; 100/93 RP; 100/160; 100/170; 100/173
[58] Field of Search .............. 15/256.51; 100/174, 100/173, 167, 166, 170, 163 R, 112, 93 RP, 160; 68/270; 162/281; 118/261; 101/169, 154, 157; 72/236

[56] References Cited

U.S. PATENT DOCUMENTS

| | | | |
|---|---|---|---|
| 334,415 | 1/1886 | Brewer | 100/93 RP X |
| 1,208,632 | 12/1916 | O'Neil | 100/174 X |
| 1,280,038 | 9/1918 | Hurter | 100/174 X |
| 1,411,983 | 4/1922 | Tomkinson | 68/270 |
| 1,818,719 | 8/1931 | Kutter | |
| 2,206,469 | 7/1940 | Peterson et al. | 68/270 X |
| 4,092,916 | 6/1978 | Link et al. | 15/256.51 X |
| 4,111,746 | 9/1978 | Biondetti | 15/256.51 X |
| 4,796,452 | 1/1989 | Schiel | 72/245 |

FOREIGN PATENT DOCUMENTS

| | | | |
|---|---|---|---|
| 2946311 | 5/1981 | Fed. Rep. of Germany. | |
| 110764 | 4/1958 | U.S.S.R. | 100/93 RP |
| 2025480 | 1/1980 | United Kingdom. | |

Primary Examiner—Harvey C. Hornsby
Assistant Examiner—Stephen F. Gerrity
Attorney, Agent, or Firm—Jeffers, Hoffman & Niewyk

[57] ABSTRACT

Holding arrangement for a device directed against a linearly adjustable roll, such as a doctor blade, blowing device or similar. On a holding arrangement for a device for surface treatment of the roll shell, directed against a linearly adjustable roll, where the roll is endways mounted through a bearing housing each in a machine frame, where for each bearing housing a cylinder/piston unit is provided for displacement of the roll, and where the roll is removable from the machine frame together with the bearing housings, a holder plate is arranged between the bearing housing and the piston of the cylinder/piston unit, which holder plate is connected with a support bearing for the device for surface treatment of the roll shell. Available is thus a holding arrangement of the categorial type which relative to the roll is well adjustable, which need not be lifted off as the roll contacts the opposite roll and which overall can be so integrated that it remains on the machine frame as the roll is lifted off.

22 Claims, 3 Drawing Sheets

HOLDING ARRANGEMENT FOR A DEVICE DIRECTED AGAINST A LINEARLY ADJUSTABLE ROLL, SUCH AS A DOCTOR BLADE, BLOWING DEVICE OR SIMILAR

BACKGROUND OF THE INVENTION

The present invention concerns a holding arrangement for a device directed at a linearly adjustable roll, for surface treatment of the roll cylinder, with the roll mounted on each end in a machine frame through a bearing housing each. A cylinder/piston unit is provided for each bearing housing for shifting of the roll, and the roll is removable from the machine frame together with the bearing housings.

The starting point of this invention should be seen in the actuating device for actuation of a roll according to the West German patent disclosure 36 10 107 (See U.S. Pat. No. 4,796,452). There, the ends of the roll are mounted in a bearing housing which with the aid of linear guidance elements can be shifted linearly. This linear displacement takes place parallel to a thrust plane which is defined by the axis of said roll and an opposite roll. This makes it possible to bring the roll in contact with the opposite roll and force it onto it, and it can be retracted again from the opposite roll. For the displacement of the bearing housings there is a single-acting cylinder/piston unit provided whose piston is in contact with the bearing housing, displacing it with the thrust force of the piston. The cylinder/piston unit preferably acts upward from below, i.e., against gravity, and at that, specifically perpendicularly. When the cylinder/piston unit is relieved, i.e. pressureless, the roll with the bearing housing rests on the cylinder/piston unit.

A preferred application for actuating devices of this type are wet presses or intermediate calendars of papermaking machines. Further applications are plastic calendars or rolling mills.

The concept of the device consisting of roll and opposite roll, for treatment of web type material, is so selected that in the case of required roll change the opposite roll is removed first so that thereafter the roll with the bearing housings can simply be lifted out upward. This requires no release of any threaded connection since the roll, in operating condition installed and held in place through the bearing housings in the linear guidance elements, can simply be lifted out of these.

This liftoff of the roll from the linear guidance elements connected with the machine frame becomes problematic in the presence of a doctor blade, a blowing device cooling the roll surface or—quite generally—a device for influencing the surface of the roll cylinder which is in contact with the roll. These devices must follow every linear displacement of the roll in order to be able to serve their purpose, and at that, in any roll position. Also, they are supposed to remain in the machine as the roll is lifted out, as long as they are not being replaced themselves.

Thus, the problem is to functionally so integrate auxiliary devices that are coupled with the roll that they will operationally follow the roll displacement, whereas they remain in the machine when the roll is lifted out. Basically, this problem has already been addressed and solved in one fashion in U.S. Pat. No. 1,818,719. There, the roll is mounted in a pivoting lever which supports a doctor blade. However, since pivoting lever constructions are relatively expensive and, consequently, also require a relatively large amount of space, they are unsuited for systems of the above type because here a compact design is required.

In view of the West German patent disclosure 36 10 107 and the United Kingdom application 2 025 480 A, where the linear guidance elements, viewed in the axial direction of the roll, are provided on both ends of the bearing housings, the idea might now be conceived in view of the solution known from U.S. Pat. No. 1,818,719 to mount the above device for influencing the roll surface on the bearing housings. But this would mean that lifting out the roller together with the bearing housings would first require a disassembly of the said device or removing it together with the roll. At any rate, this concept is associated with relatively laborious and expensive manipulations.

Known from the West German patent disclosure 29 46 311 is a solution where a doctor blade is mounted on a fixed frame. But this solution can be successfully applied only in the case of a relatively short displacement stroke. Furthermore, this design requires arranging the doctor blade sideways beside the roll, which as well is considered to be disadvantageous. The greatest disadvantage of this design is that the doctor blade must have lifted off exactly when the probability that the paper web will unintentionally wrap around the roll ("wrapping the roll") is the greatest, namely in closing or opening the roll gap.

The problem underlying the present invention thus is to provide a holding arrangement of the categorial type which with regard to the functional coordination of the device for influencing the roll surface is adjustable toward the roll, which in setting the roll on the opposite roll need not be lifted off, and which in the overall arrangement can be so integrated that it will remain on the machine frame as the roll is lifted out, and at that, without requiring a space-wasting and expensive motional mimetic.

SUMMARY OF THE INVENTION

According to the basic idea of the present invention, this problem is solved in that between the bearing housing and the piston of the cylinder/piston unit there is a holder plate installed which is connected with a support bearing for the device for the surface treatment of the cylinder surface of the roll.

Thus, as the cylinder/piston unit is activated, the piston pushes against the loosely installed holder plate forcing it against the bearing housing. Thus, the roll can be displaced in customary fashion in its linear guidance elements. As the roll is lifted out, the holder plate remains on the piston/cylinder unit or on the base of the machine frame. The device for surface treatment of the cylinder shell (hereafter termed doctor blade) being mounted on the holder plate, the doctor blade remains in the machine frame and the roll can be lifted out without problem.

As an advancement of the above basic idea, the holder plate is extended sideways, and at that offset in order to support it by means of a support device provided on the machine frame when the roll is lifted out or on account of the geometric coordination between the lever of the bearing housing and the roll diameter.

Thus, the holder plate can be supported in the inoperative condition by way of its extension, so as to compensate for the lever effect of the support bearing resting on the extension. The roll is lifted out and reinstalled in the machine frame jointly with the bearing housings. To ensure proper positioning between the bearing housings and the holder plate as the roll is inserted, and thus in exact positioning of the doctor blade relative to the roll, the facing sides of the bearing housing and holder plate are provided with locking means that complement each other, specifically in the form of slot and key or in the form of a taper pin and a matching bore. Based on the sides that are in contact with each other, these locking means are preferably doubled.

Generally, a single-acting piston/cylinder unit is sufficient for displacement of the bearing housing and, thus, the roll, with the force to be transmitted by the piston to the bearing housing being variable by variation of the operating pressure in the cylinder. This solution is sufficient in view of cylinder/piston units with short operating strokes.

In the case of larger overall heights, the single-acting cylinder/piston unit may be substituted by a double-acting cylinder/piston unit where the piston force can then be specifically adjusted by stressing the piston on the rod side.

However, the cylinder/piston unit may be realized as well by a tandem arrangement where the said single-acting cylinder/piston unit is coordinated with a separate, single-acting opposite cylinder. In this case, the opposite cylinder acts, through tie rods which extend through the cylinder/piston unit and are connected with the holder plate, against the single-acting cylinder/piston unit, permitting as well an accurate regulation of the piston pressure.

In the case of an application-specific holding arrangement for a doctor blade directed against the cylinder surface of the roll or bearing on it, the support bearing is connected with a doctor blade beam supporting a doctor blade which is in axially parallel alignment to the roll.

Details of the invention will be more fully explained hereafter with the aid of the drawing.

DESCRIPTION OF THE PREFERRED EMBODIMENTS

Figure 1:
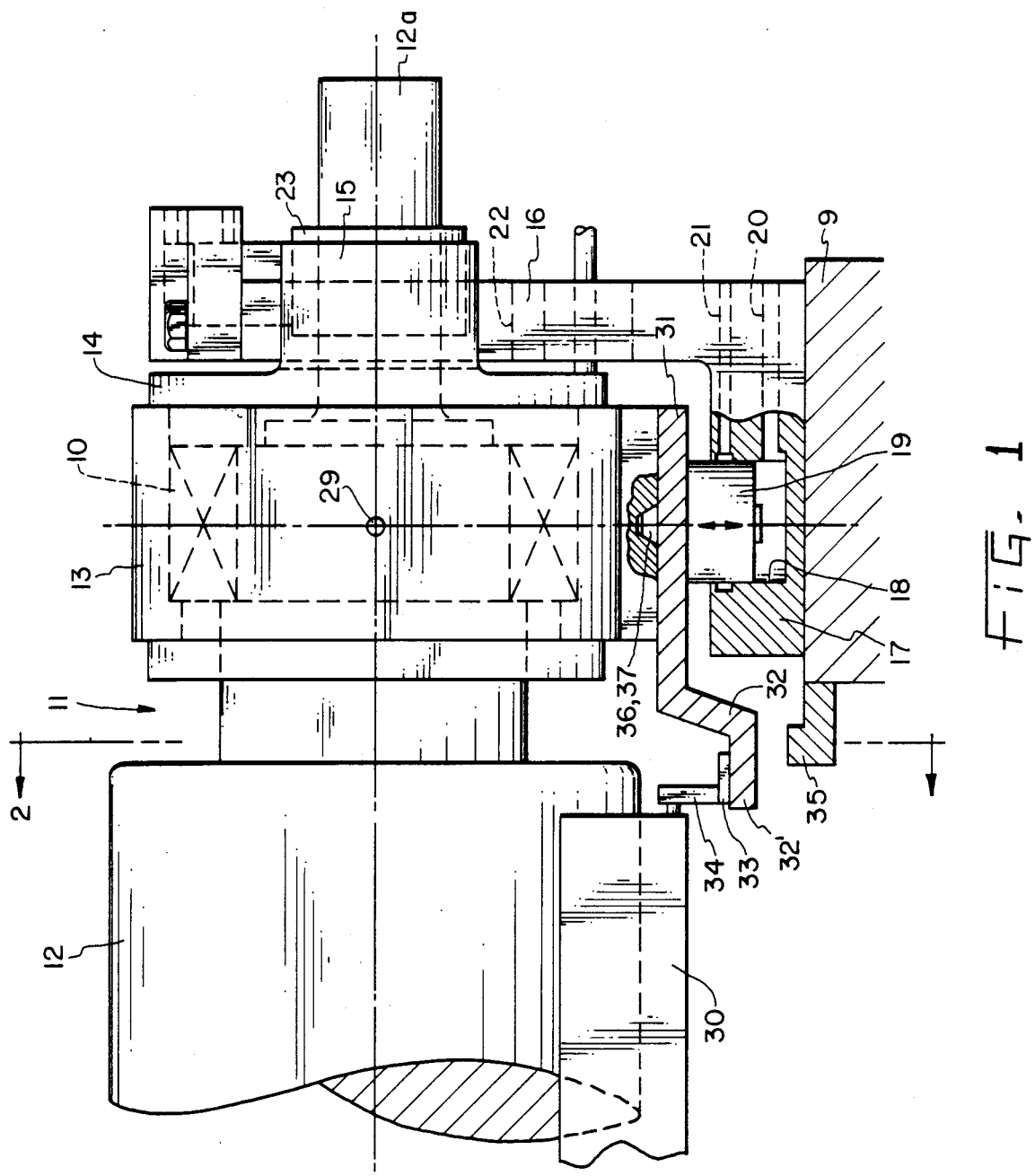
FIG. 1 shows a side elevation of an actuating device for a roll with integrated holding arrangement.
Figure 3:
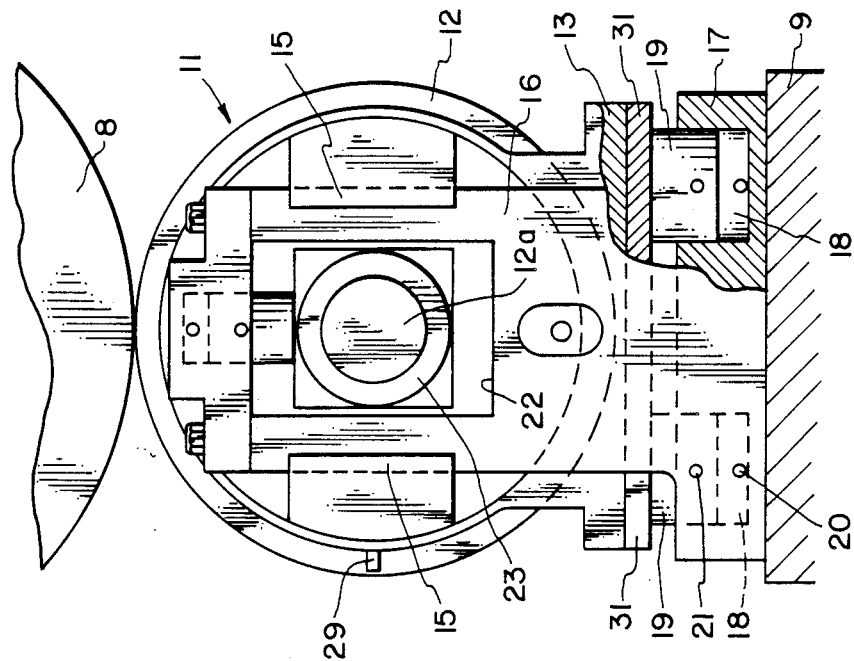
FIG. 3 shows an end view of an actuating device for a roll illustrating the arrangement of the cylinder/piston unit.
Figure 2:
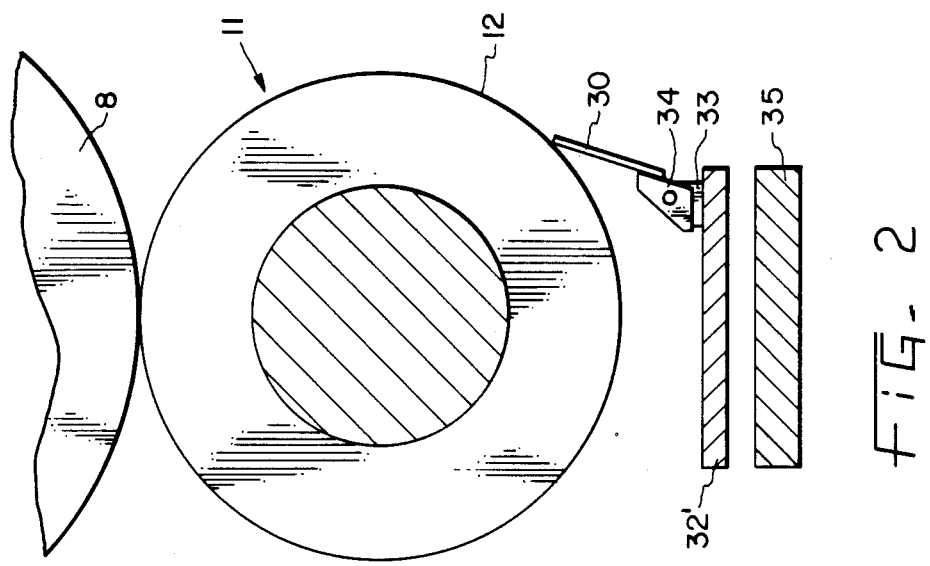
FIG. 2 shows a sectional illustration of the actuating device according to FIG. 1 along line A—A.

FIGS. 1 through 3 show an actuating device for a roll marked 11 overall. The roll has a rotatable shell 12 and a rotatable or, and at that preferably, fixed journal 12a which by means of a schematically indicated antifriction bearing 10 is rotatably mounted in a bearing housing 13. The bearing housing 13, and thus the entire roll 11, is vertically adjustable in FIGS. 1 and 2. Rigidly connected with the bearing housing 13 is an end plate 14 with guide claws 15. These guide claws 15 wrap around a stationary, endwise guide plate 16 which on its base is connected with the base 17. The guide claws 15 and the guide plate 16 form the linear guidance elements which were repeatedly mentioned in the Summary above. The sliding faces of the guide plate 16 may be made from hardened, stainless steel while the sliding faces on the plate 14 and the guide claws 15 may be made, e.g., from plastic panels. The guide plate 16 and base 17 may be separate elements or, as illustrated, combined to a preferably integral "guide carrier." In all cases, the guide plate 16 and base 17 are set rigidly on a machine frame 9. Any bolts used to connect the base 17 with the machine frame have been omitted in the drawing. In variation from the illustrated design, the base 17 and/or guide plate 16 may be components of the machine frame 9 itself.

As follows explicitly from the illustration relative to FIG. 3, the base 17, viewed across its width, features two vertical cylinder bores 18 with pistons 19 reciprocating in them. Hydraulic fluid may be admitted to the cylinder bores 18 through feed channels 20. The customary ring seals between the cylinder bores 18 and pistons 19 are not illustrated. A leakage oil collection chamber each having the shape of an annular groove is provided on the upper end of the cylinder bores 18. The leakage oil collecting there can be removed through drain channels 21 and flow to an oil reservoir through not illustrated return lines.

From FIGS. 1 and 3 it is evident that the oil pressure prevailing in the cylinder bores 18 acts on the pistons 19, enabling them to lift the bearing housing 13 from the base 17. It is understood that customary control devices (omitted in the drawing) are available for turning the oil pressure on and off and for changing the pressure level. When the oil pressure is shut off, the bearing housing 13 will in the illustrated arrangement settle down on the base 17 under the weight of the roll 11.

Pursuant to the cylinder/piston unit illustrated in FIGS. 1 and 3, consisting of the cylinder bore 18 and piston 19, only a single-acting unit is illustrated. But it is quite conceivable to design the cylinder/piston unit so as to be double-acting, in which case the drain channel 21 serves then as a pressure channel for stressing the appropriately designed piston 19 on the rod side.

Figure 4:
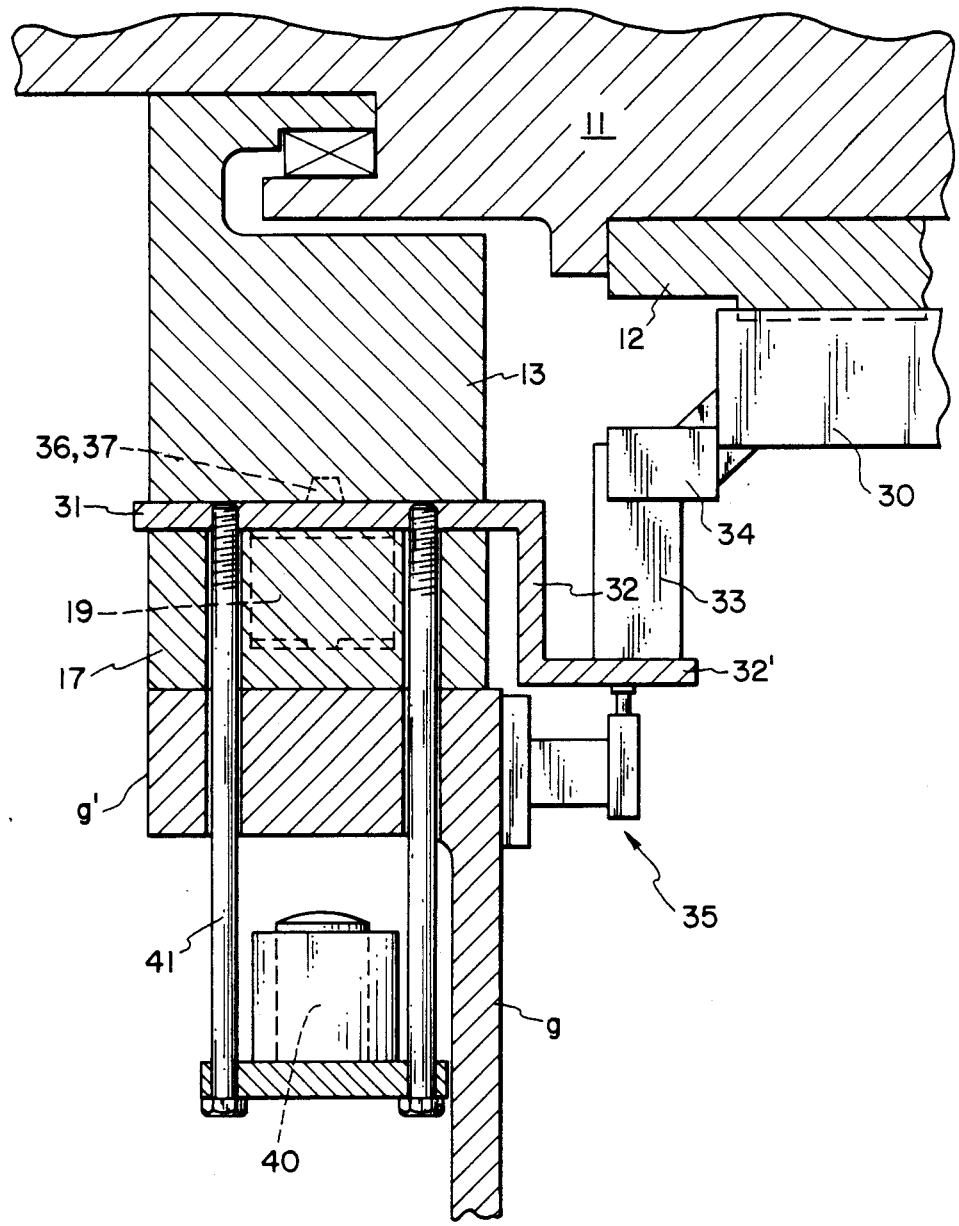
FIG. 4 shows an embodiment of the cylinder/piston unit with a single-acting cylinder and an opposite-acting opposite cylinder.

Another embodiment regarding the cylinder/piston unit is illustrated with the aid of FIG. 4, in which context it is to be noted here that both the said double-acting cylinder/piston unit and the cylinder/piston unit yet to be explained with the aid of FIG. 4 enable an exact adjustment of the operating pressure acting on the bearing housing 13 and, thus, on the roll 11.

In FIGS. 1 through 3 it is assumed that the roll 11 is forced in a vertical upward direction on an opposite roll 8 arranged above. A basic premise is that the roll is always displaced against gravity toward the opposite roll 8, i.e., with a vertical directional component.

To make the actuating device suitable for any arrangement and application that might occur, the following additional measures are used: the endways guide plate 16 has a recess 22 for the roll journal 12a on which an auxiliary bearing 23 is arranged. Lubricating oil can be fed to the antifriction bearing 10 contained in the bearing housing 13, through a feed line 29. This lubricating oil is returned to a reservoir for cooling, and at that, through a drain 28 for which in the endways guide plate 16 an oblong window is provided.

The actuating device described so far is known and described with regard to further design details in the West German patent disclosure 36 10 107.

The object of the present invention is to so advance and complement this prior actuating device that a doctor blade 30 bearing on the roll shell 12 will be displaced quasi rigidly with the roll but then, when the roll is lifted out, retracts automatically from the roll by gravity and remains on the machine frame 9.

In this advanced actuating device, a holder plate 31 is arranged between the bearing housing 13 and the operating side (pressure side) of the piston 19, so that the piston 19 acts only indirectly on the bearing housing 13. The holder plate 31 rests flat on the piston 19 and on the underside of the bearing housing 13, thus moving in exact synchronism with the bearing housing 13 and the roll 11. As the roll 11 lifts off, the piston/cylinder unit is relieved first permitting the holder plate 31 to settle on the base 17 or—with the proper design—on the machine frame 9. The roll 11 can now be removed.

The holder plate 31 features sideways a preferably offset extension 32 which in the end area 32' supports a support bearing (33) for mounting of a doctor blade beam 34. This doctor blade beam 34, in turn, is connected with the doctor blade 30 itself, making it possible to displace the latter linearly together with the holder plate 31 and the roll 11; the spacing between the doctor blade 30 and the roll shell 20 remains constant.

To provide a sideways tilting of the holder plate 31 with the support bearing 33 in the relieved condition of the cylinder/piston unit, the machine frame 9 or, as the case may be, the base 17 is provided with a support device 35 of a design such that the holder plate 31 bears by way of its sideways extension 32 when the piston 19 is retracted.

As a further development of the actuating device complemented by the holder plate 31, mutually complementary locking means are provided on facing sides of the bearing housing 13, for one, and on the holder plate 31, for another. This is to accomplish, for one, automatically an exact positioning between bearing housing 13 and holder plate 31 or between roll shell 12 and doctor blade 30, respectively, as a new roll is installed and, for another—when two and facultatively more of these complementary locking means are distributed across contacting faces of bearing housing 13 and holder plate 31—is to ensure a correct rotational position of these parts relative to one another. These locking means may be realized by means of slot/key designs known as such or—as indicated in the drawing by— taper pins and bores 36 and 37.

FIG. 4 shows a particular embodiment of an actuating device with a double-acting cylinder/piston unit for the linear displacement of the bearing housing 13 with the roll (roll shell 12). The bearing housing 13 bears on the holder plate 31 which, in turn, bears on the working side of the piston 19 of the single-acting cylinder/piston unit consisting of said piston and the cylinder bore 18. The cylinder/piston unit 18/19, in turn, is bolted to the machine frame 9 so that the extending piston 19 displaces, and at that—in the drawing plane—perpendicularly upward, the holder plate 31 and thus the bearing housing 13 with the roll 11, relative to the machine frame 9.

The holder plate 31 and bearing housing 13 feature a mutually complementary pairing 36/37 of a taper pin and a corresponding bore. The holder plate 31 features sideways the offset extension 32 which in the inoperative condition bears on the support device 35 which is fixed on the machine frame 9 and, specifically, adjustable in height. Provided on the extension 32 is the support bearing 33 for the doctor blade beam 34 of the doctor blade 30 which rests on the roll 11, axially parallel to it.

The cylinder/piston unit 18/19 sits on a sideways projection 9' of the machine frame 9. Arranged below this sideways projection 9' is an as well single-acting opposite cylinder 40, and at that, in such a way that, for one, it is connected in nonpositive fashion with the holder plate 31 through tie rods 41 that extend through the projection 9' and the cylinder/piston unit 18/19, and in that the opposite cylinder, for another, is relative to the machine frame 9 so installed and connected with it that its operating stroke counteracts the operating stroke of the cylinder/piston unit 18/19. This makes it possible to accurately adjust the pressure for forcing down on the opposite roll 8, which pressure acts on the bearing housing 13 and the roll 11.

What is claimed is:
1. Apparatus comprising:
a machine frame;
a roll cylinder having a longitudinal axis and a pair of ends, each end mounted in said machine frame through a bearing housing;
a counter roll having a longitudinal axis and mounted in said machine frame axially parallel to said longitudinal axis of the roll cylinder, said roll cylinder and said counter roll being removable from the machine frame together with said bearing housings;
means for shifting said roll cylinder linearly transverse to the longitudinal axis thereof relative to said machine frame to press said roll cylinder onto said counter roll, said means including a cylinder/piston unit associated with each bearing housing, said cylinder/piston unit being arranged opposite said counter roll;
means directed against said roll cylinder for surface treatment of said roll cylinder; and
a holder plate arranged directly between the bearing housing and the cylinder/piston unit and connected with a support bearing for the means for surface treatment of said roll cylinder, said holder plate being situated so that said cylinder/piston unit acts directly against said holder plate when operable to press said roll cylinder onto said counter roll, said means directed against the roll cylinder and said holder plate being connected to said machine frame and remaining connected to said frame when said roll cylinder and said counter roll together with said bearing housings are removed from said machine frame.

2. Apparatus according to claim 1, in which the holder plate at one end of the roll cylinder includes an extension extending toward the other end of the roll cylinder, and the support bearing is fixed on the extension.

3. Apparatus according to claim 2, in which the extension of the holder plate is offset in a direction transverse to the longitudinal axis of the roll cylinder.

4. Apparatus according to claim 3, in which below the extension there is a support device provided which supports the holder plate when the piston is retracted.

5. Apparatus according to claim 3, in which the holder plate bears on the bearing housing, and the holder plate and the bearing housing feature complementary mutually engaging locking means.

6. Apparatus according to claim 3, in which the cylinder/piston unit is fashioned as a double-acting unit.

7. Apparatus according to claim 3, in which the support bearing is connected with a doctor blade beam which, in turn, supports a doctor blade which bears on the cylinder surface of the roll cylinder parallel to the axis of the roll cylinder.

8. Apparatus according to claim 2, in which below the extension there is a support device provided which supports the holder plate when the piston is retracted.

9. Apparatus according to claim 8, in which the holder plate bears on the bearing housing, and the holder plate and the bearing housing feature complementary mutually engaging locking means.

10. Apparatus according to claim 8, in which the cylinder/piston unit is fashioned as a double-acting unit.

11. Apparatus according to claim 8, in which the support bearing is connected with a doctor blade beam which, int urn, supports a doctor blade which bears on the cylinder surface of the roll cylinder parallel to the axis of the roll cylinder.

12. Apparatus according to claim 2, in which the holder plate bears on the bearing housing, and the holder plate and the bearing housing feature complementary mutually engaging locking means.

13. Apparatus according to claim 2, in which the cylinder/piston unit is fashioned as a double-acting unit.

14. Apparatus according to claim 2, in which the support bearing is connected with a doctor blade beam which, in turn, supports a doctor blade which bears on the cylinder surface of the roll cylinder parallel to the axis of the roll cylinder.

15. Apparatus according to claim 1, in which the holder plate bears on the bearing housing, and the holder plate and the bearing housing feature complementary mutually engaging locking means.

16. Apparatus according to claim 15, in which the cylinder/piston unit is fashioned as a double-acting unit.

17. Apparatus according to claim 15, in which the support bearing is connected with a doctor blade beam which, in turn, supports a doctor blade which bears on the cylinder surface of the roll cylinder parallel to the axis of the roll cylinder.

18. Apparatus according to claim 1, in which the cylinder/piston unit is fashioned as a double-acting unit.

19. Apparatus according to claim 18, in which the support bearing is connected with a doctor blade beam which, in turn, supports a doctor blade which bears on the cylinder surface of the roll cylinder parallel to the axis of the roll cylinder.

20. Apparatus according to claim 1, in which the support bears is connected with a doctor blade beam which, in turn, supports a doctor blade which bears on the cylinder surface of the roll cylinder parallel to the axis of the roll cylinder.

21. Apparatus comprising:
a machine frame;
a roll cylinder having a longitudinal axis and a pair of ends, each end mounted in said machine frame through a bearing housing, said roll cylinder being removable from the machine frame together with the bearing housings;
means for shifting said roll cylinder linearly transverse to the longitudinal axis thereof relative to said machine frame, said means including a cylinder/piston unit associated with each bearing housing, said cylinder/piston unit including a single-acting unit and a separate opposite cylinder, with the single-acting units acting, by way of a holder plate, directly on the bearing housing, and with the opposite cylinder acting by way of tie rods on the holder plate, counter to the thrust direction of the single-acting unit;
means directed against said roll cylinder for surface treatment of said roll cylinder; and
said holder plate arranged directly between the bearing housing and the cylinder/piston unit and connected with a support bearing for the means for surface treatment of said roll cylinder, said holder plate being situated so that said cylinder/piston unit acts directly against said holder plate when operable to shift said roll cylinder. supports a doctor blade which bears on the cylinder surface of the roll cylinder parallel to the axis of the roll cylinder.

22. Apparatus according to claim 21, in which the support bearing is connected with a doctor blade beam which, in turn, supports a doctor blade which bears on the cylinder surface of the roll cylinder parallel to the axis of the roll cylinder.

* * * * *

UNITED STATES PATENT AND TRADEMARK OFFICE
CERTIFICATE OF CORRECTION

PATENT NO.   :   4,986,178
DATED        :   January 22, 1991
INVENTOR(S)  :   Paul Hafner, Christian Schiel It is certified that error appears in the above-identified patent and that said Letters Patent is hereby corrected as shown below:

Claim 11, column 7, line 14, delete "int urn" and substitute therefor --in turn--.

Claim 20, column 8, line 4, delete "bears" and substitute therefor --bearing--.

Claim 21, column 8, lines 35-37, delete "supports a doctor blade which bears on the cylinder surface of the roll cylinder parallel to the axis of the roll cylinder.--

Signed and Sealed this

Twenty-third Day of June, 1992

Attest:

DOUGLAS B. COMER

*Attesting Officer*   Acting Commissioner of Patents and Trademarks